United States Patent [19]
Harfst

[11] Patent Number: 5,855,278
[45] Date of Patent: Jan. 5, 1999

[54] CASE FOR ACCOMMODATING A FLAT ELECTRONIC APPARATUS

[75] Inventor: Karl-Hermann Harfst, Langgöns, Germany

[73] Assignee: Consel Kofferlösungen GmbH, Langgöns, Germany

[21] Appl. No.: 898,808

[22] Filed: Jul. 23, 1997

[30] Foreign Application Priority Data

Jan. 10, 1997 [DE] Germany ............ 197 00 562.4

[51] Int. Cl.⁶ ...................................... B65D 69/00
[52] U.S. Cl. ..................... 206/576; 206/523; 206/320
[58] Field of Search ........................ 206/576, 523, 206/701, 320, 591, 594, 521, 592, 305; 248/346.04; 108/55.1, 55.4

[56] References Cited

U.S. PATENT DOCUMENTS

| 5,467,874 | 11/1995 | Whitaker | 206/378 |
| 5,529,174 | 6/1996 | McQueeny | 206/749 |
| 5,666,265 | 9/1997 | Lutz et al. | 361/683 |

*Primary Examiner*—Paul T. Sewell
*Assistant Examiner*—Nhan T. Lam
*Attorney, Agent, or Firm*—Barnes, Kisselle, Raisch, Choate, Whittemore & Hulbert, P.C.

[57] ABSTRACT

A computer case with a foam inlay into which are embedded lift devices which can be released by a pressure applied to the top thereof so that they can raise the computer out of the inlay. The application of pressure to the lift devices again causes the computer to be moved down into the inlay again.

10 Claims, 2 Drawing Sheets

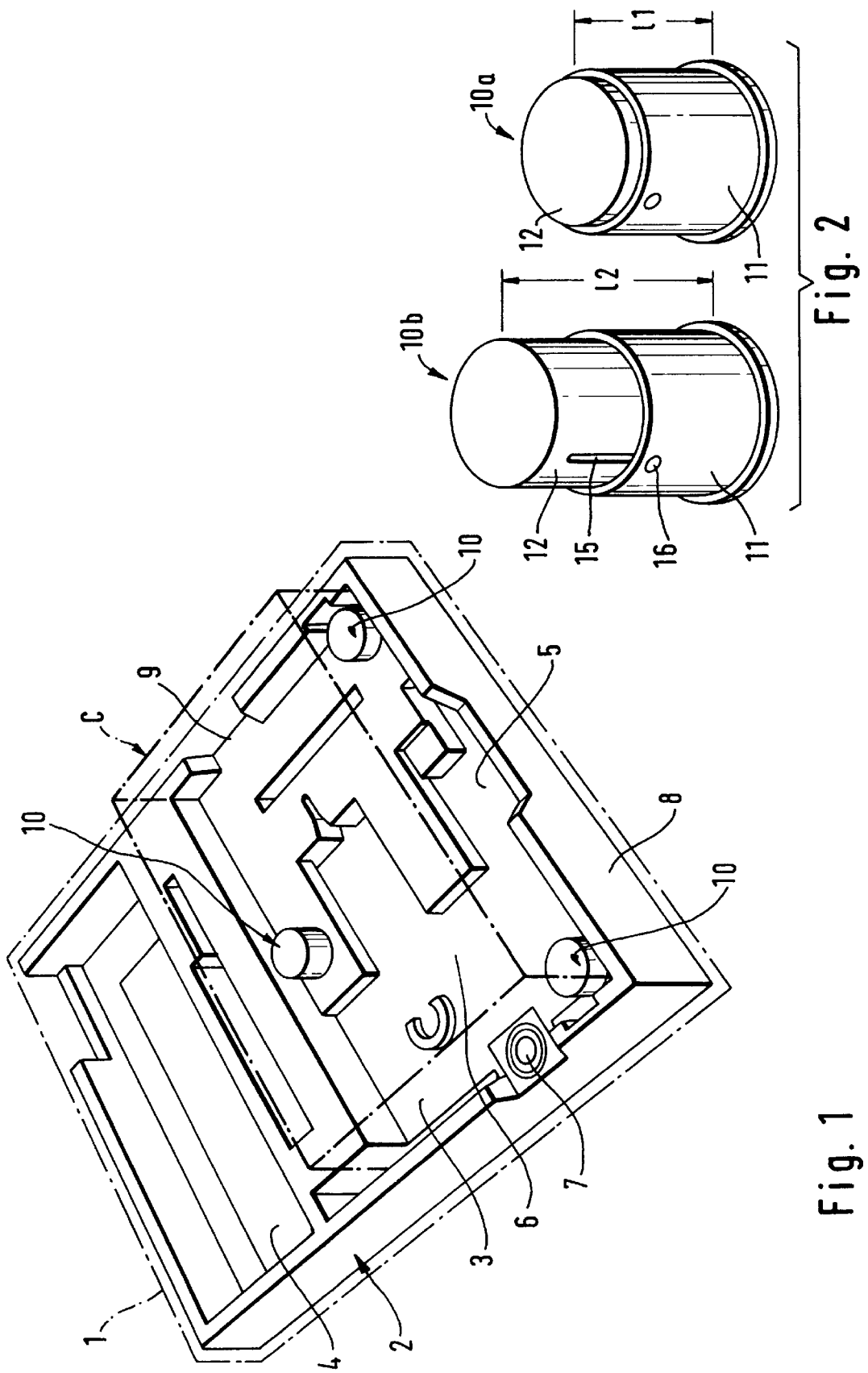

CASE FOR ACCOMMODATING A FLAT ELECTRONIC APPARATUS

FIELD OF THE INVENTION

The invention concerns a case for accommodating a flat electronic apparatus such as a computer notebook. More specifically the invention concerns a case for accommodating a flat electronic apparatus having interface accesses or ports at the narrow sides thereof.

BACKGROUND OF THE INVENTION

Computer cases are used to protect a computer while travelling and frequently also house ancillary items of equipment such as a printer and a mains power supply unit. While in principle it is possible for the computer to be lifted out of the case in order to operate thereon, it is nonetheless often desirable for the computer to be left in the bottom portion of the case during operation thereof. In that situation however there is the disadvantage that the case and more particularly a foam inlay therein which cushions the computer in the case may partially cover over the narrow sides of the computer and thus impede accessibility to the interface accesses or ports of the computer.

SUMMARY OF THE INVENTION

An object of the present invention is to provide a case for a flat electronic apparatus such as a computer which by virtue of a simple operating effect exposes the interface accesses or ports at the narrow sides of the computer.

Another object of the present invention is to provide a case for accommodating a flat electronic apparatus which is capable of securely receiving the apparatus therein while nonetheless affording ready easy access to the apparatus while still accommodated at least in part in the case.

Still another object of the present invention is to provide a case for accommodating an apparatus such as a computer notebook which can receive the computer notebook in a well-protected fashion therein while affording easy access to the computer notebook for operation thereof, by a simple procedure and involving a simple structure.

In accordance with the principles of the present invention the foregoing and other objects are attained by a case for accommodating a flat electronic apparatus having interface access means at narrow sides thereof, comprising a case housing which has at least a bottom portion. A foam inlay is disposed in the bottom portion and adapted to suitably fill gaps between the bottom portion and the apparatus to be received therein. The case further includes at least one stroke or lift means including a guide element disposed on the bottom portion and a guided element which is guided by the guide element and which is adapted to bear against the underside of the electronic apparatus. A drive means is operable to alternately move the guide element and the guided element into first and second relative positions in which said elements are arranged to provide a short support length and a long support length respectively.

As will be seen in greater detail from the description of a preferred embodiment of the invention hereinafter, the at least one lift means may comprise at least one lift cylinder providing the guide element and the guided element guided thereby, with the lift cylinder being disposed between the bottom portion of the case housing and the computer or other apparatus accommodated in the case. The lift cylinder can occupy first and second positions, more specifically a retracted position in which the movable member thereof is retracted and thus for example disappears into the wall of the foam inlay in the bottom portion of the case, and an extended position in which the lift cylinder raises the computer to such an extent that the interfaces of the computer such as various plugs or ports, the disk drive, the COD-ROM-drive and the like become accessible. In general three or four lift cylinders will be used per computer. If lift cylinders are disposed adjacent the rear edge of the computer and when such lift cylinders are moved into the extended position, that provides for inclining the keyboard of the computer, as is desirable for ergonomic reasons. By actuating all lift cylinders, it is also possible to raise the front edge of the computer and thus to lift the narrow sides of the computer entirely out of the foam inlay surrounding same.

The lift cylinder constituting the lift means is essentially a guide body with a guide groove, into which engages the front end of a coupling pin which is adapted to come into operative association with first and second detent or retaining locations disposed adjacent the lower and upper ends of the guide body. The coupling pin is carried in a pivotal arm which represents a certain support length. The guide body and the pivotal arm cover each other in the retracted position of the lift cylinder while in the extended position the pivotal arm is disposed substantially outside the covering position, thus forming a support structure which affords two different lengths. The shorter length means that the lift cylinder is in a retracted condition while the longer length of the support structure is involved when the lift cylinder is in the extended position.

Further objects, features and advantages of the invention will be apparent from the following description of a preferred embodiment of the invention.

BRIEF DESCRIPTION OF THE DRAWING

FIG. 1 is a perspective view of a foam inlay in a bottom portion of a case for accommodating a flat electronic apparatus, FIG. 2 is a perspective view of two lift cylinders in the retracted position and the extended position respectively.

DESCRIPTION OF THE PREFERRED EMBODIMENT

Figure 4:
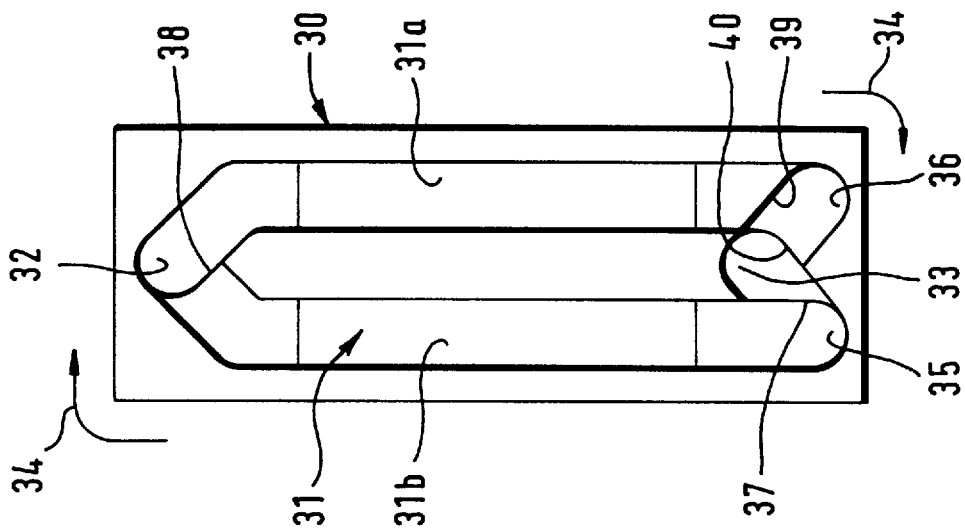
FIG. 4 is a view on to a guide body.

A case for accommodating a flat electronic apparatus such as for example and more particularly a computer notebook usually includes a bottom portion 1 which is diagrammatically indicated by dash-dotted lines and an upper portion (not shown). Disposed in the bottom portion and the upper portion are respective inlays for example of foam material which are designed closely and snugly to embrace the flat computer and to protect it as far as possible from shocks and the like upon transportation thereof. The inlay as indicated at 2 in the bottom portion 1 is therefore adapted to the individual specific electronic apparatus to be fitted in the case. As will be apparent from FIG. 1, there is a receiver space 3 for accommodating a computer notebook and a space 4 for accommodating a printer. A mains power supply unit can be disposed in a space 5 which extends in a layer beneath the space 3. The spaces 3, 4 and 5 are connected together by way of a flat or ribbon cable 6. Reference numeral 7 denotes a venting means. The side walls 8 are of a somewhat irregular shape and are also in part provided with openings as indicated at 9 which however are not sufficient to afford access to all the interface connections or ports of the computer notebook. It is in this respect that the present invention provides its effect.

Referring therefore still to FIG. 1, shown therein is a lift arrangement comprising a plurality of lift means which in the present embodiment are provided by first, second and third lift cylinders 10 which can be manually actuated to adopt a retracted position as indicated at 10a in FIG. 2 or an extended position as indicated at 10b in FIG. 2. The lift cylinders 10 are of such a flat structure that in the retracted position they disappear into the inlay 2 while their length in the extended position is sufficient to raise the computer which is indicated at C in FIG. 1 in order to afford access to its interface connections or ports disposed at the narrow sides of the computer. The mode of operation of the lift cylinders is like that of change-over switches, in that upon manual pressure actuation each lift cylinder alternately adopts the positions 10a and 10b respectively.

Figure 3:
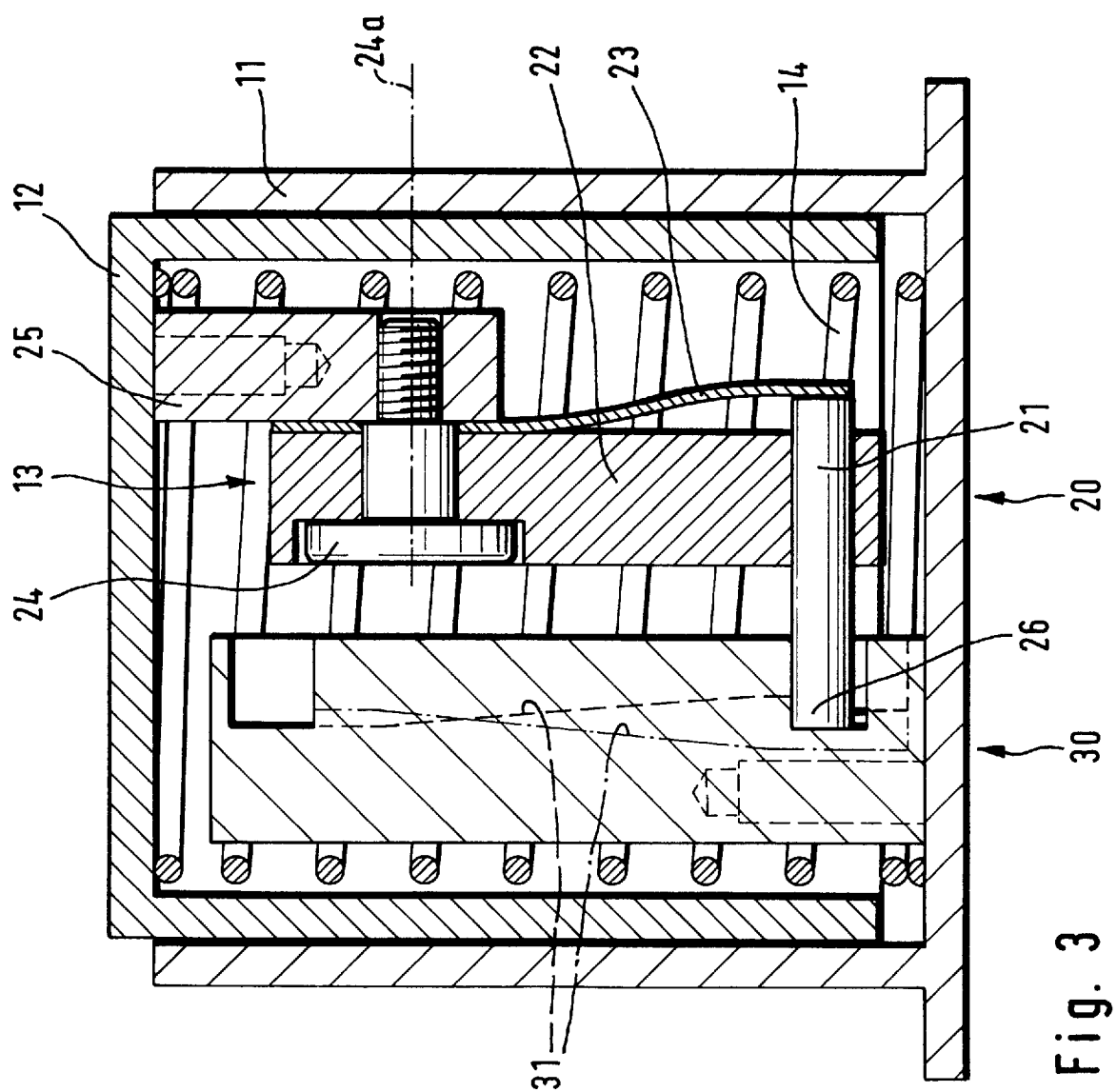
FIG. 3 is a view in section on an enlarged scale through the lift cylinder.

Reference will now be made to FIG. 3 showing a view in section through a lift cylinder on an enlarged scale. It includes a cylinder portion 11 which forms a guide element, for fixing to the bottom portion 1 of the case, and a cup-shaped piston 12 forming a guided element, which is adapted to come into contact with the underside of the computer notebook. Reference numeral 13 denotes an actuating drive means in the form of an actuating switching device for moving the lift cylinder into the respective positions indicated at 10a and 10b in FIG. 2. More specifically the device 13 includes a compression coil spring 14 which seeks to urge the cylinder 11 and the piston 12 away from each other. The extension length afforded by movement of the piston 12 out of the cylinder 11 is limited by a slot indicated at 15 in FIG. 2, in the piston 12. Engaging into the slot 15 is the front end of a pin screw as indicated at 16 in FIG. 2, which is screwed into a transverse bore in the peripheral wall part of the cylinder portion 11. The cylinder portion 11 and the piston 12 are thus non-losably held together and the piston 12 cannot turn upon being extended, which would otherwise be the case by virtue of the presence of the coil spring used as the compression spring 14.

The actuating device 13 is adapted to form a support structure of respective predetermined lengths as indicated at $1_1$ and $1_2$ in FIG. 2, corresponding to the retracted position 10a and the extended position 10b respectively. In order to afford those different lengths, two elongate support portions, namely a guide groove body as generally indicated at 30 in FIG. 3 and a follower unit as generally indicated at 20 in FIG. 3, extend in side-by-side association with each other, either in overlapping relationship in respect of the position 10a or substantially displaced relative to each other in respect of the position 10b. The two support portions 20 and 30 are connected together by way of a coupling element as indicated at 21 in the form of a pin. The coupling pin 21 is freely movably carried in a transverse bore in a pivotal arm 22 and is urged in the direction of the guide groove body 30 by a leaf spring 23 which is screwed at one end thereof to the pivotal arm 22. The pivotal arm 22 is secured by means of a trunnion screw 24 to a holder 25 and at the same time is mounted rotatably about a pivotal axis as indicated at 24. The holder 25 is screwed to the closed end portion of the piston 12. The follower unit 20 is thus entrained with the piston 12 while the guide groove body 30 is entrained with the cylinder portion 11, to the end part of which it is suitably fixed as by screwing.

The guide groove body 30 has a guide groove as indicated at 31 in FIG. 3, the width thereof corresponding to the front engagement end 26 of the coupling pin 21. Referring now additionally to FIG. 4, the guide groove 31 comprises first and second groove legs or portions 31a and 31b which extend substantially parallel to each other in the lengthwise direction of the cylinder portion 11, and the guide groove 31 thus forms a closed path of an elongate heart-shaped configuration with a tip facing upwardly in FIG. 4. The guide groove 31 defines an upper retaining or detent location as indicated at 32 and a lower retaining or detent location as indicated at 33. The arrangement is such that the front engagement end 26 of the coupling pin 21 passes through the above-defined closed path only in one passage direction as indicated by arrow 34. That is achieved by virtue of the fact that, at the lower detent location 33 the pin no longer slides back into that detent location 33 when the engagement end 26 of the pin 21 has reached a lower position as indicated at 35 in the path of movement thereof. From there the engagement end 26 of the coupling pin 21 moves under a spring force towards the upper detent location 32 and, when the piston 12 is depressed in the cylinder portion 11, along the groove portion 31a towards the further lower location 36 from which the spring force moves the pin 21 into the detent location 36. The pin comes into retaining contact in the detent location 33 so that the spring 14 cannot displace the piston 12 upwardly again, unless the pin 21 is moved into the position as indicated at 35 from which then it again passes along the groove portion 31b into the upper detent location 32, as a result of the spring force.

The movement of the coupling pin 21 through the guide groove 31 in the specified direction indicated by the arrow 34 can be produced by a suitable action on the pivotal arm 22, which for example presupposes the existence of a suitable device for pivoting the pivotal arm 22 towards the right or the left respectively, depending on whether the coupling pin 21 is disposed in the proximity of the upper or the lower detent location 32 or 33 respectively. Another possibility is for the engagement end 26 of the coupling pin 21 to be of a configuration which promotes movement of the coupling pin 21 through the guide groove 31 in one direction (free-running mode) while blocking such movement in the opposite direction.

In the preferred embodiment described and illustrated herein the movement of the engagement end 26 of the coupling pin 21 in the direction indicated by the arrow 34 is compelled to occur by virtue of the shape of the guide groove 31. More specifically the guide groove 31 has steps as indicated at 37, 38, 39 and 40 in FIG. 4, over which the engagement end 26 of the coupling pin 21 can only slide in one direction. Accordingly the engagement end 26 follows the bottom of the guide groove because the leaf spring 23 applies a corresponding pressure to the coupling pin 21. At the step 37 the level of the groove falls from 4.4 mm at the detent location 33 to 5.2 mm at the location 35. In the groove portion 31b the level of the groove then progressively rises to 3.6 mm in order then to fall at the step 38 to 4.4 mm at the detent location 32. In the groove portion 31a the groove depth is gradually decreased from 4.4 mm to 2.8 mm at the step 39 at which the groove bottom drops away to a depth of 3.6 mm. At the detent location 33 with a groove depth of 4.4 mm, there is once again a step 40 which prevents the pin end 26 from sliding back into the groove portion 31a.

As can be seen from FIG. 1, the illustrated case has first, second and third lift cylinders 10, wherein two of those lift cylinders are arranged in the proximity of the front operating edge of the apparatus or computer while the remaining lift cylinder is disposed beneath the rear edge of the computer. Actuation of that rear lift cylinder means that the rear edge of the computer can be raised and thus the keyboard thereof is put into a somewhat inclined position, which serves to enhance operator convenience and comfort. By pressing on the front two lift cylinders they then adopt a position as indicated at 10b in FIG. 2 which involves a longer support length and the front edge of the computer is thus also raised. In that way the side edges of the computer C which is of a generally flat or shallow construction and therewith also connecting plugs or ports disposed at the side edge or edges of the computer as well as insertion slots for disk drives and the like are readily accessible. By applying pressure to the computer the lift cylinders 10 can be lowered again so that the computer moves downwardly to be received in the inlay in the computer case, and the case can thus be closed.

While a circular-cylindrical shape for the lift devices 10 is preferred, it will be appreciated that it is also possible for the lift devices to be of other closed or open peripheral shapes without thereby departing from the scope of protection of the present invention.

It will be further appreciated that the above-described embodiment of the present invention has been set forth solely by way of example and illustration of the principles thereof and that various other modifications and alterations may be made therein without departing from the spirit and scope of the invention.

What is claimed is:

1. A case for accommodating a flat electronic apparatus having interface accesses at narrow sides thereof, comprising:
   a case housing having at least a bottom portion;
   a foam inlay in the bottom portion, adapted to suitably fill gaps between the bottom portion and the apparatus to be received therein; and
   at least one lift means including a guide element on the bottom portion, a guided element guided by the guide element and adapted to bear against the underside of the electronic apparatus, and a drive means operable to alternately move the guide element and the guided element into first and second positions in which said guide element and said guided element are arranged to define a short support length and a long support length respectively.

2. A case as set forth in claim 1
   wherein the drive means comprises:
   a spring means adapted to urge the guide element and the guided element away from each other;
   a coupling element;
   a guide groove body for guiding the coupling element;
   a follower means carrying the coupling element;
   wherein the guide groove body is fixed to one of the guide element and the guided element and the follower means is movably mounted to the other of the guide element and the guided element;
   wherein the guide groove body has a guide groove having an upper detent means and a lower detent means for the coupling element, wherein the guide groove body, the coupling element and the follower means form a support structure either of the short support length or the long support length:
   and the arrangement is such that when pressure is applied to the spring means the coupling element is movable out of the respective detent means whereupon the coupling element goes to the respective other detent means in order to come into detent engagement therein.

3. A case as set forth in claim 2
   wherein said coupling element is adapted to go from the upper detent means to the lower detent means against the force of the spring means and from the lower detent means to the upper detent means under the force of the spring means.

4. A case as set forth in claim 2
   wherein the follower means includes a pivotal arm holding the coupling element;
   wherein the coupling element is in the form of a coupling pin; and
   further including a holder to which the pivotal arm is fixed and which in turn is fixed to one of the guided element and the guide element.

5. A case as set forth in claim 2
   wherein the guide groove forms a closed path of elongate heart-shaped configuration with its tip facing upwardly; and
   including means for causing the coupling element to circulate in one passage direction in the guide groove.

6. A case as set forth in claim 5
   wherein said means for causing the coupling element to circulate in one direction comprise a depth profile of the guide groove in conjunction with a spring biasing means operatively associated with the coupling element, said depth profile including steps in the groove bottom in opposite relationship to the passage direction of the coupling element in the guide groove.

7. A case as set forth in claim 6
   wherein the coupling element is in the form of a pin movable in a bore in the pivotal arm, and
   wherein the pin has a first end portion projecting into the guide groove and a second end portion,
   and further including a leaf spring applying a spring biasing force to said second end portion of said pin.

8. A case as set forth in claim 2
   wherein the spring element is a coil spring and
   wherein one of said guide element and said guided element has a slot and the other of said guide element and said guided element has a pin engaging into said slot.

9. A case as set forth in claim 2
   wherein the guide element is formed by a cylinder portion and the guided element is formed by a cup-like piston, the cylinder portion and the piston being telescopically guided one within the other with a compression spring enclosed therebetween as the spring element and the guide element and the guided element enclosing in a housing-like configuration the guide groove body and the follower means.

10. A case as set forth in claim 1
    comprising first, second and third lift means in the case housing, wherein first and second lift means are disposed at least in the proximity of the front operating edge of the electronic apparatus and a third lift means is arranged beneath the rear edge thereof.

* * * * *